US008811187B2

(12) United States Patent
Macias et al.

(10) Patent No.: US 8,811,187 B2
(45) Date of Patent: Aug. 19, 2014

(54) RADIO ACCESS NETWORK TECHNOLOGY OPTIMIZATION BASED ON APPLICATION TYPE

(75) Inventors: John F. Macias, Antelope, CA (US);
David Chiang, Fremont, CA (US);
Steven R. Rados, Danville, CA (US);
Lalit R. Kotecha, San Ramon, CA (US);
Thomas W. Haynes, San Ramon, CA (US); Yee Sin Chan, San Jose, CA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 131 days.

(21) Appl. No.: 13/211,589

(22) Filed: Aug. 17, 2011

(65) Prior Publication Data

US 2013/0044603 A1    Feb. 21, 2013

(51) Int. Cl.
*H04W 24/00* (2009.01)

(52) U.S. Cl.
USPC ........... 370/241; 370/465; 370/466; 370/446;
370/445; 455/442; 455/436; 455/433; 455/434

(58) Field of Classification Search
USPC ......................................................... 370/241
See application file for complete search history.

(56) References Cited

U.S. PATENT DOCUMENTS

| 6,804,519 | B1 * | 10/2004 | Czaja et al. | 455/442 |
|---|---|---|---|---|
| 7,236,781 | B2 * | 6/2007 | Patil et al. | 455/432.1 |
| 7,990,875 | B2 * | 8/2011 | Massiera et al. | 370/237 |
| 8,144,660 | B2 * | 3/2012 | Lee et al. | 370/331 |
| 8,223,718 | B2 * | 7/2012 | Tachikawa et al. | 370/331 |
| 8,265,039 | B2 * | 9/2012 | Reza et al. | 370/332 |
| 8,270,981 | B2 * | 9/2012 | Cho et al. | 455/441 |
| 2006/0120329 | A1 * | 6/2006 | Kim et al. | 370/331 |
| 2006/0268784 | A1 * | 11/2006 | Lee et al. | 370/331 |
| 2007/0086382 | A1 * | 4/2007 | Narayanan et al. | 370/331 |
| 2007/0217427 | A1 * | 9/2007 | Chung | 370/395.2 |
| 2008/0008196 | A1 * | 1/2008 | Hong | 370/401 |
| 2008/0261597 | A1 * | 10/2008 | Hayama et al. | 455/436 |
| 2010/0040018 | A1 * | 2/2010 | Appani et al. | 370/331 |
| 2011/0034167 | A1 * | 2/2011 | Ben-Shaul et al. | 455/432.1 |
| 2011/0199962 | A1 * | 8/2011 | Kahn et al. | 370/328 |
| 2011/0268098 | A1 * | 11/2011 | Keller et al. | 370/338 |
| 2012/0014269 | A1 * | 1/2012 | Ray et al. | 370/252 |
| 2012/0108277 | A1 * | 5/2012 | Chan et al. | 455/501 |
| 2012/0300706 | A1 * | 11/2012 | Kahn et al. | 370/328 |
| 2012/0322447 | A1 * | 12/2012 | Ramachandran et al. | 455/436 |

* cited by examiner

*Primary Examiner* — Ian N Moore
*Assistant Examiner* — Lakeram Jangbahadur

(57) ABSTRACT

A mobile device may monitor availability of access networks that provide connectivity for the mobile device. The mobile device may also store preference information, on a per-application basis, relating to preferences for using the access networks by applications executed by the mobile device. The mobile device may additionally select, in response to a request from an application to connect to the network, one of the access networks, based on the preference information for the application; and provide a communication channel for the application using the selected access network.

16 Claims, 8 Drawing Sheets

| RAT ID | CONNECTIVITY STATE | QoS INDEX |
|---|---|---|
| 3G | NOT CONNECTED | - |
| 4G | CONNECTED | 2 |
| WiFi, NETWORK1 | CONNECTED | 3 |
| WiFi, NETWORK2 | NOT CONNECTED | - |

Fig. 4

| APPLICATION ID | PREF ACCESS TYPE | MIN QoS INDEX |
|---|---|---|
| VoIP APP | 4G, 3G, WiFi | 3 |
| GAME1 | WiFi, 4G, 3G | 1 |
| EMAILAPP | WiFi, 4G, 3G | 1 |
| DEFAULT | WiFi, 4G, 3G | 1 |

Fig. 5

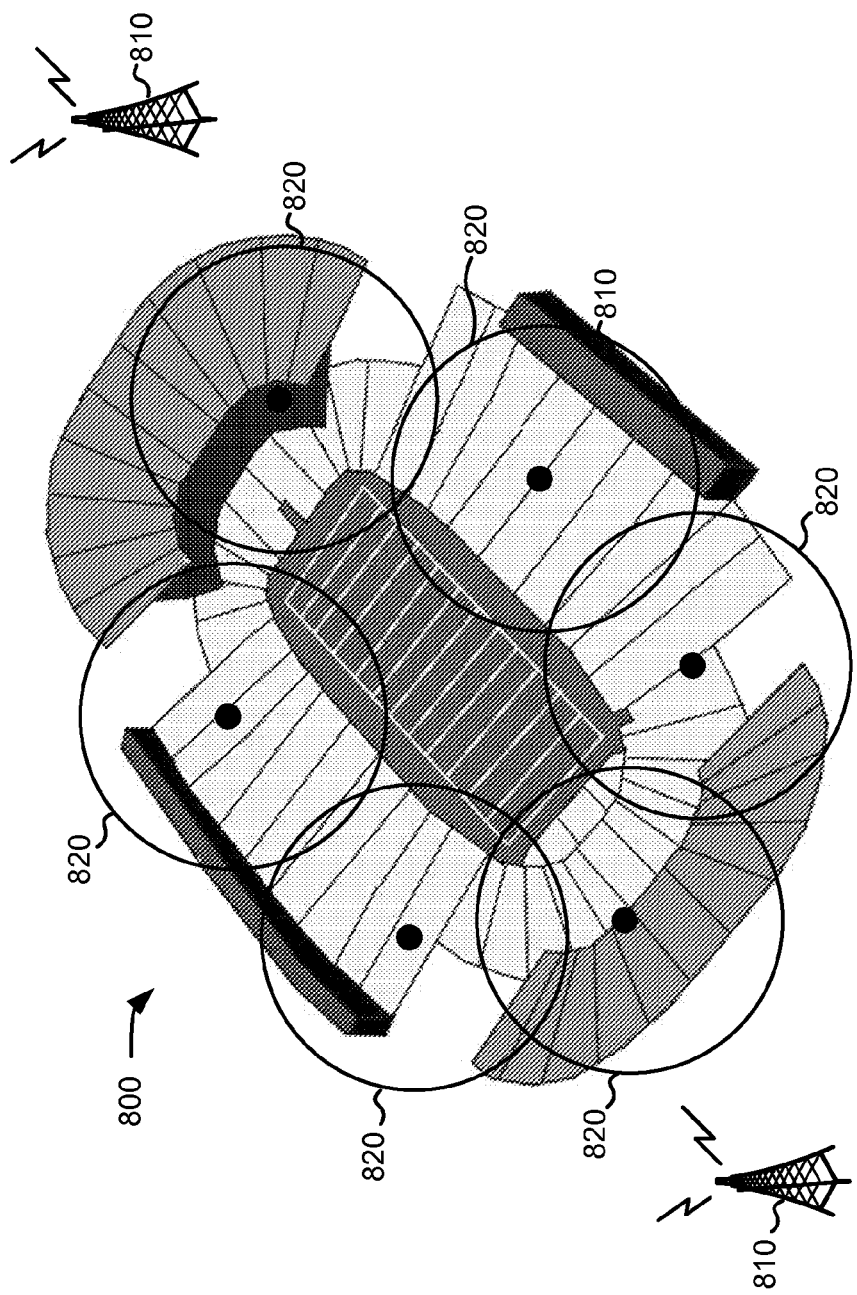

RADIO ACCESS NETWORK TECHNOLOGY OPTIMIZATION BASED ON APPLICATION TYPE

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

Mobile devices, such as smart phones, may include logic to connect to the network through multiple different radio interfaces. For instance, a mobile device may include circuits to connect to a network through an IEEE 802.11 (WiFi) access network, a Third Generation (3G) cellular access network, and/or a Fourth Generation (4G) cellular access network. The mobile device may, at certain times, simultaneously connect to multiple ones of these access networks or connect to the most preferred access network that is available.

BRIEF DESCRIPTION OF THE DRAWINGS

FIG. 4 is a diagram illustrating an example data structure for storing access network availability data;

FIG. 5 is a diagram illustrating an example data structure for storing application access network preference data;

FIG. 8 is a diagram illustrating an example application of some of the techniques described herein.

DETAILED DESCRIPTION OF PREFERRED EMBODIMENTS

The following detailed description refers to the accompanying drawings. The same reference numbers in different drawings may identify the same or similar elements.

Techniques described herein may relate to the use of different radio access networks, by a mobile device, for connecting to a network. The mobile device may include circuitry for connecting to multiple different access networks, such as a WiFi access network, a 3G cellular network, and/or a 4G cellular network. The mobile device may choose, on a per-application basis, which access network to use to provide network connectivity for the application. A particular access network may be chosen for an application based on application preferences, available access networks, and/or the mobility of the user of the mobile device.

Figure 1:
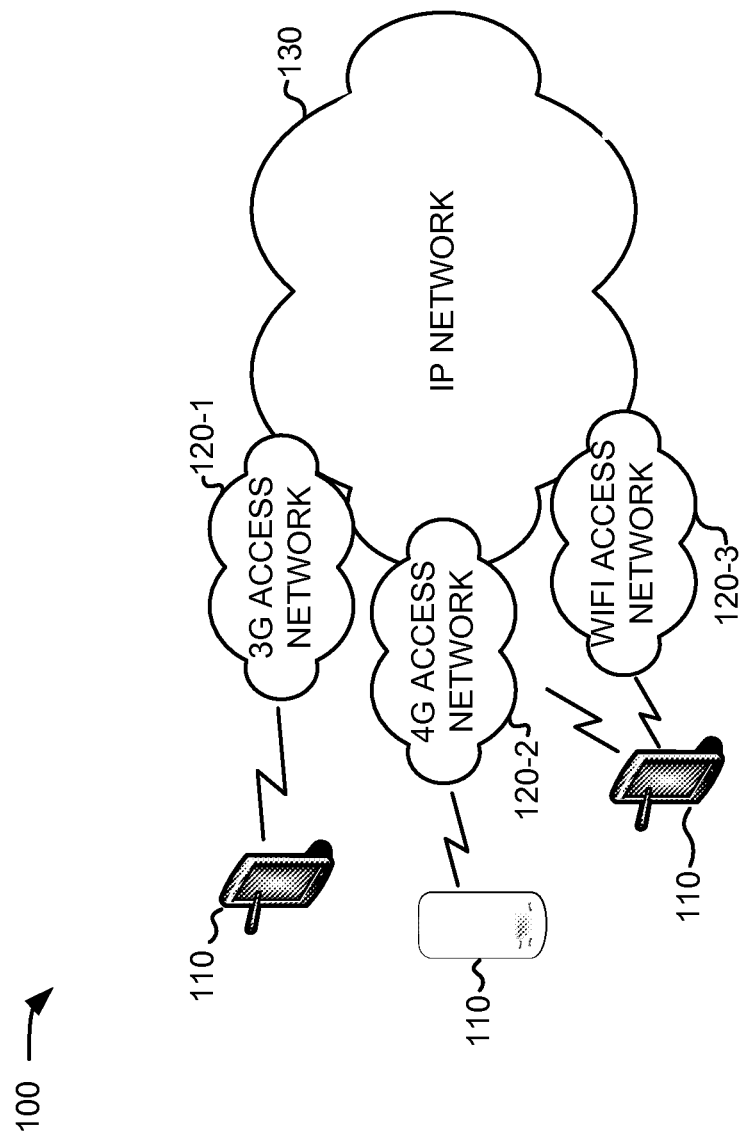
FIG. 1 is a diagram of an example environment in which systems and/or methods described herein may be implemented.

FIG. 1 is a diagram of an example environment 100 in which systems and/or methods described herein may be implemented. As illustrated, environment 100 may include mobile devices 110, access networks 120-1 through 120-3, and a network 130. Access networks 120 may also be referred to as radio access networks (RATs) herein.

Mobile devices 110 may include portable computing and communication devices, such as a personal digital assistant (PDA), a smart phone, a cellular phone, a tablet computer, a laptop with integrated connectivity to a cellular wireless network, etc. Mobile devices 110 may connect to network 130. A number of different radio access technologies (RATs), illustrated as access networks 120-1 through 120-3, may be used to connect a mobile device 110 to network 130. Mobile devices 110 may include logic to connect to multiple different access networks. For example, a mobile device 110 may concurrently connect to both access network 120-1 and access network 120-3.

Access networks 120-1 through 120-3 (collectively referred to as "access networks 120") may include logic to provide access for mobile devices 110 to network 130. Access networks 120 may include a number of different access technologies. Three example access networks are shown in FIG. 1: a 3G access network 120-1, a 4G access network 120-2, and a WiFi access network 120-3. In alternative implementations, other types of access networks may be used.

Access network 120-1 may be a network that provides a wireless (radio) interface to mobile devices 110 using the 3GPP Long Term Evolution (LTE) standard. Access network 120-1 may include, for example, one or more radio interface components (called base stations or eNodeBs) that may each communicate with mobile devices 110 within a geographical area (e.g., a sector or cell) assigned to the radio interface component. Access network 120-1 may include other devices, connected through wired or wireless links, to provide services relating to the operation of access network 120-1. Access network 120-2 may be a network that provides a wireless (radio) interface to mobile devices 110 using the 4GPP LTE standard. As with access network 120-1, access network 120-2 may include one or more base stations that may each communicate with mobile devices 110 within a geographical area.

A mobile device 110 moving between cells in an access network 120-1 or 120-2 may be "handed off" to different cells (e.g., a different base station) in the access network without interrupting a communication session of the mobile device 110. This type of an access network may be referred to as a "cellular" network herein.

Access network 120-3 may include a WiFi network, or multiple different WiFi networks, to which mobile devices 110 may connect. More generally, access network 120-3 may include any locally available wireless network. For example, a consumer may install a home WiFi router that may be used to connect the consumer's mobile device 110 to a wired network (e.g., a coaxial or fiber optic network) that is connected to the consumer's home. As another example, a business may install a number of WiFi access points that are used to wirelessly connect devices in a local office to a wired network.

Other types of access networks than those shown in FIG. 1 may be used to connect mobile devices 110 to network 130, such as, for example, a universal terrestrial radio access network (UTRAN). For example, in some implementations, a non-wireless access network may be used. Users may thus be able to attach a cable to mobile devices 110 to physically connect mobile devices 110 to a wired network.

Network 130 may include public or private (or both) Internet protocol (IP) network(s). Network 130, may be, for example, a packet-based wide area network. Network 130 may be used to implement telecommunication services, such as through the IP Multimedia Services (IMS) architecture. In some implementations, network 130 may connect to additional networks. For instance, network 130 may include or connect to a private network and a public network, such as the Internet.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
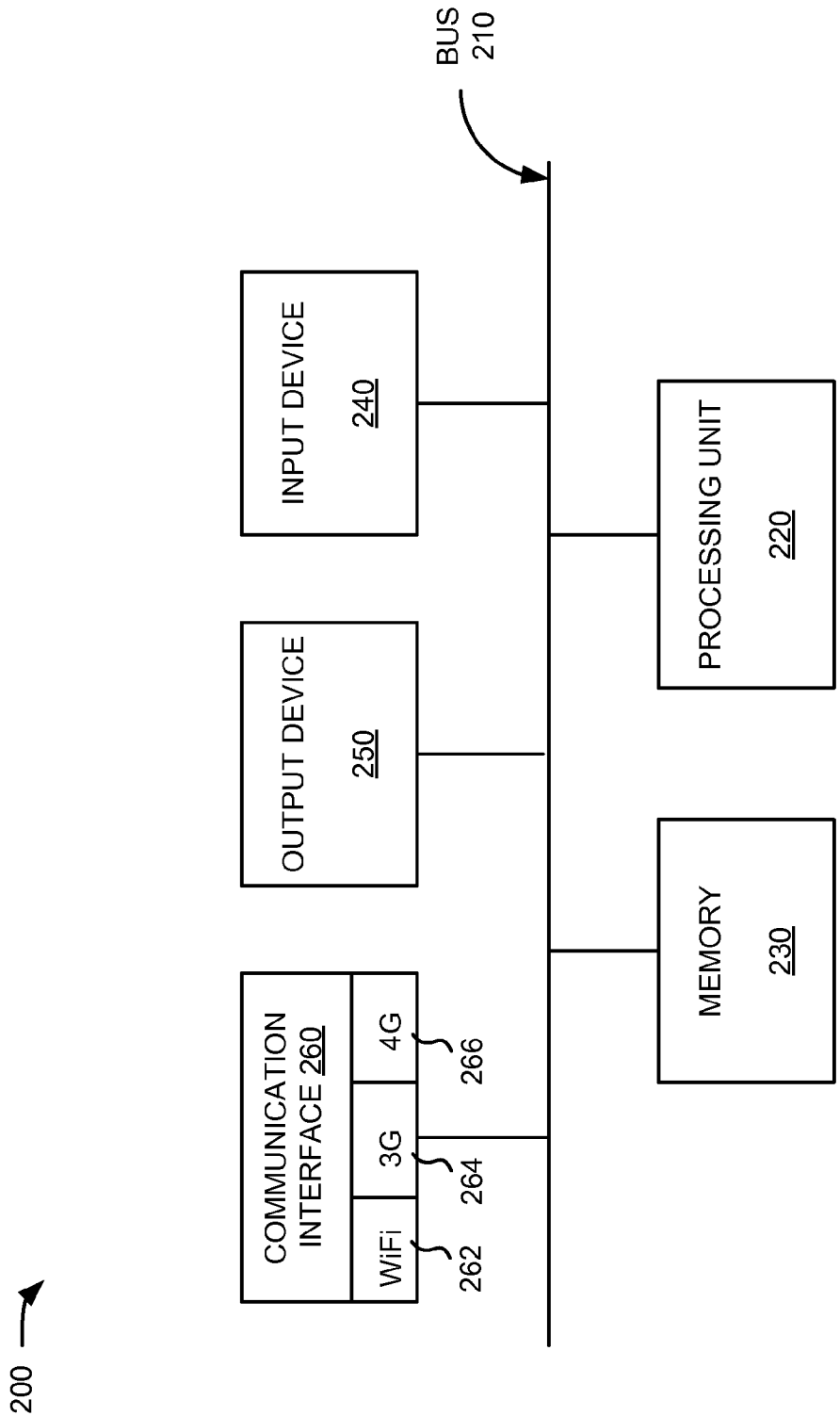
FIG. 2 is a diagram of example components of a device that may correspond to one of the components shown in the environment of FIG. 1.

FIG. 2 is a diagram of example components of a device 200 that may correspond to one of the components shown in environment 100, such as mobile device 110 or a device in network 130. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices.

In one implementation, in which communication interface 260 is included as part of a mobile device 110, communication interface 260 may include logic for communicating with access networks 120. In FIG. 2, a WiFi component 262, a 3G component 264, and a 4G component 266 are particularly illustrated as being part of communication interface 260. These components may include circuitry, such as components to implement a transceiver, for wirelessly connecting to WiFi access network 120-3, 3G access network 120-1, and 4G access network 120-2. In some implementations, components 262, 264, and 266 may be combined or may share portions of the same transceiver circuitry. For example, 3G component 264 and 4G component 266 may share portions of or all of the antenna and other circuitry needed to connect to a 3G/4G network.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
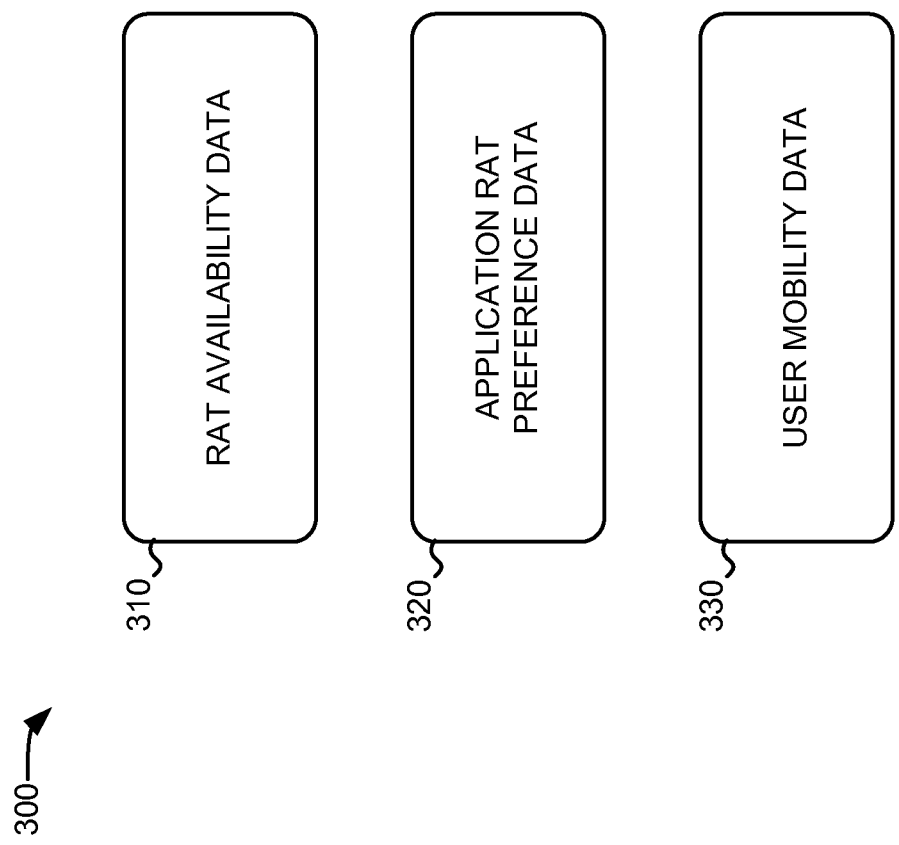
FIG. 3 is a diagram illustrating example data structures that may be maintained by a mobile device.

FIG. 3 is a diagram illustrating example data structures 300 that may be maintained by a mobile device 110. Data structures 300 may include radio access technology (RAT) availability data 310, application RAT preference data 320, and user mobility data 330. Each of data structures 300 may be stored by mobile device 110 as, for example, a file, as part of a database, a table in memory, etc.

RAT availability data 310 may include information relating to the availability of and/or connectivity to access networks 120, by mobile devices 110. For instance, a mobile device 110 may update RAT availability data 310 whenever mobile device 110 connects to or comes within range of one of access networks 120. In some implementations, RAT availability data 310 may also include information relating to the strength or stability of the connection to access networks 120. For example, RAT availability data 310 may store a value indicating the strength of a connection or quality of service (QoS) parameters related to the connection. The QoS parameters may include, for example, an estimated available bandwidth and latency for the connection. Alternatively or additionally, the QoS parameters may be represented as a single index value, called a QoS index herein. The QoS index may be a single value that characterizes the QoS needed or desired by an application.

Application RAT preference data 320 may include access network preference information for particular applications that may be executed by mobile device 110. Different applications, installed on mobile device 110, may be associated with different access network preferences. For example, a voice over IP (VoIP) application may prefer a WiFi connection. Another application, however, may prefer a 3G/4G connection. In one implementation, application RAT preference data 320 may include a per-application prioritized list in which access networks 120 may be listed, on a per-application basis, in an order in which more preferred access networks 120 are listed before less preferred access networks 120.

In some implementations, application RAT preference data 320 may additionally or alternatively include QoS preference information. For example, a particular application may specify a minimum required or preferred QoS index.

User mobility data 330 may include information relating to the mobility of mobile device 110. For example, a user that is moving in an automobile may be highly mobile. In this case, certain access networks, such as WiFi access network 120-3, may not be an appropriate access network for applications, because connectivity to WiFi access network 120-3 is likely to be lost as the user drives though the limited range of WiFi access network 120-3. The mobility information for user mobility data 330 may be obtained, for example, from location information tracked by mobile device 110. Mobile device 110 may track its location using, for example, a combination of global positioning system (GPS) data, base station triangulation with base stations in access networks 120-1 and 120-2, or other techniques.

In one implementation, the mobility of a user may be inferred from the strength and/or length of a current connection to WiFi access network 120-3. For instance, if mobile device 110 has been connected, through a stable connection, to WiFi access network 120-3, for a significant period of time (e.g., greater than two minutes), the user may be considered to be stationary. This technique for measuring mobility may be useful when WiFi access network 120-3 moves with the user, such as a WiFi access network 120-3 provided to passengers on a train. The mobility of a user may be stored as a value, such as an integer between one (stationary) and five (highly mobile).

Although FIG. 3 shows example data structures 300 that may be maintained by mobile device 110, in other implementations, data structures 300 may include fewer elements, different elements, or additional elements than depicted in FIG. 3.

FIG. 4 is a diagram illustrating an example data structure 400 for storing RAT availability data 310. Data structure 400 may be maintained by a mobile device 110. In general, data structure 400 may store information relating to the current connectivity of mobile devices 110 to various access networks 120. As shown, data structure 400 may include a RAT identification (ID) field 410, a connectivity state field 420, and a QoS index field 430.

RAT ID field 410 may store identification information corresponding to a particular access network 120. Different access networks 120 may be identified in different ways. For example, 3G access network 120-1 and 4G access network 120-2 may be identified using a value, such as a string value, that indicates the type of access network (e.g., "3G" or "4G"). In some implementations, other information, such as identification information relating to a particular base station to which mobile device 110 is connected, may instead be additionally included in RAT ID field 410.

In FIG. 4, two WiFi networks, labeled "WiFi, Network1" and "WiFi, Network2," are illustrated, which may correspond to two separate WiFi networks to which mobile device 110 is connected or has previously connected.

Connectivity state field 420 may include an indication of the connectivity state of the access network in the corresponding RAT ID field 410. As shown, the example states "not connected" and "connected" are used to indicate the connection state of mobile device 110 to a particular radio access technology. In the illustrated example, connectivity state field 420 indicates that mobile device 110 is connected to 4G access network 120-2 ("4G") and to WiFi network 120-3 ("WiFi, Network1"). The connectivity status of the other two access networks of FIG. 4 ("3G" and "WiFi, Network2") are illustrated in FIG. 4 as "not connected," indicating that mobile device 110 may not currently be connected to these access networks.

QoS index field 430 may store an indication of the current QoS available from the access network identified by RAT ID field 410. In the example illustrated, assume that the QoS index is represented as an integer in which high values indicate better QoS. For example, the access network "WiFi, Network1," which has a QoS index of 3 may provide a higher bandwidth and/or lower latency connection than access network "4G," which has a QoS index of 2.

Although FIG. 4 shows example fields in data structure 400, in other implementations, data structure 400 may be structured differently or contain fewer fields, different fields, or additional fields.

FIG. 5 is a diagram illustrating an example data structure 500 for storing application RAT preference data 320. Data structure 500 may be maintained by a mobile device 110. In general, data structure 500 may store information relating to the access network or QoS preferences of various applications that may be executed by mobile device 110. As shown, data structure 500 may include an application identification (ID) field 510, a preferred (PREF) access type field 520, and a minimum (MIN) QoS index field 530.

Application ID field 510 may identify various applications that may be installed on mobile device 110. Application ID field 510 may include, for example, a string or other value that may be used to identify an application. A number of example applications are shown in FIG. 5, including: "VoIP APP," such as an application to provide VoIP telephone calling functionality from mobile device 110; "GAME1," such as a game installed on mobile device 110; "EMAILAPP," such as the primary email application that is used by mobile device 110; and "DEFAULT," which may indicate any application that is not otherwise included in application ID field 510.

Preference access type field 520 may include preference information relating to access networks 120 for each application identified in application ID field 510. In one implementation, the preference information may be expressed as an ordered list of preferred access networks 120 for the application. As shown, the application "VoIP APP" may prefer 4G access network 120-2, if it is available. If 4G access network 120-2 is not available, 3G access network 120-1 may be preferred. If neither 4G access network 120-2 nor 3G access network 120-1 is available, WiFi access network 120-3 may be preferred. Structures other than a list may alternatively be used to store access network preferences for applications.

Different applications may have different lists of preferred access type networks. The applications "GAME1," "EMAILAPP," and "DEFAULT," for example, include WiFi as the first access network preference type, followed by 4G and then 3G.

Minimum QoS index field 530 may store the minimum QoS index that is required by or preferred by a particular application. For example, as illustrated, the application "VoIP App" may require a minimum QoS index of 3, while the other illustrated applications may be less network sensitive and may require a QoS index of 1. In some implementations, parameters relating to QoS, other than a QoS index, such as network latency or network bandwidth, may alternatively or additionally be used.

Although FIG. 5 shows example fields in data structure 500, in other implementations, data structure 500 may be structured differently or contain fewer fields, different fields, or additional fields.

Figure 6:
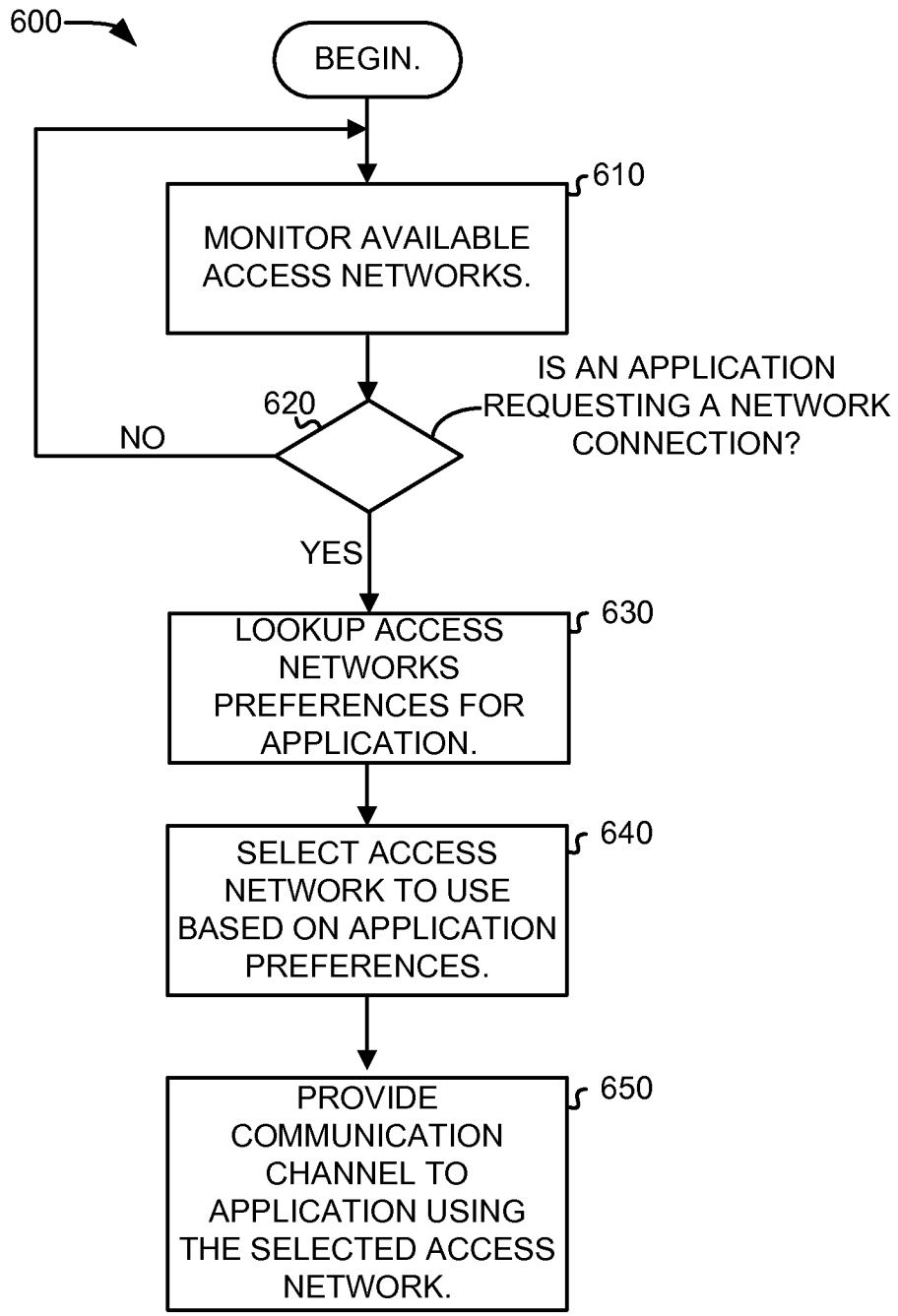
FIG. 6 is a flow chart illustrating an example process for connecting an application through an access network.

FIG. 6 is a flow chart illustrating an example process 600 for connecting an application through an access network 120. Process 600 may be performed, for example, by one of mobile devices 110.

Process 600 may include monitoring the access networks 120 that are currently available to the mobile device (block 610). Mobile device 110 may, for instance, monitor which access networks are currently within range of the wireless communication interface, the signal strength associated with the currently available access networks, the connectivity status (e.g., connected or not connected) of the available access networks, and/or QoS information (such as the QoS index) associated with each of the available access networks. The monitored information may be maintained in a data structure, such as data structure 400 (RAT availability data).

Process 600 may further include determining whether an application requests a network connection (block 620). An application, such as an application executed by mobile device 110, may implement a number of services that require a network connection. For example, a VoIP application, a multiplayer online game, a web browser, or any other application that accesses a remote resource may need a network connection through one of access networks 120. Mobile device 110, such as through an operating system of mobile device 110, may assign or otherwise control the allocation of network resources to the applications.

When a network connection is requested, (block 620—YES), mobile device 110 may select an appropriate access network to use for the network connection (blocks 630 and 640). Mobile device 110 may look up the access network preferences for the application (block 630). Mobile device 110 may, for example, lookup the application in application RAT preference data 320 (e.g., data structure 300), to obtain one or more preferred access networks and/or to obtain a minimum requested QoS index for the application. In one implementation, if the application is not explicitly included in application RAT preference data 320, a default set of access network preference data may be used (e.g., the "DEFAULT" application in data structure 500).

Based on the looked-up access network preferences for the application, mobile device 110 may select an access network 120 (block 640). In addition to the looked-up access network 120, mobile device 110 may also use other information when selecting an access network 120, such as RAT availability data 310. In one implementation, mobile device 110 may select an access network 120 to which mobile device 110 is connected and that is most preferred by the application (i.e., the selected access network may be the first access network in preferred access type field 520, for the application, for which there is a connection to the access network). In an alternative possible implementation, instead of using information from preferred access type field 520, mobile device 110 may select an access network 120 to which mobile device 110 is connected and that has a minimum QoS, such as a minimum QoS index, as specified in minimum QoS index field 530, for the application. In yet another possible implementation, both preferred access type field 520 and minimum QoS index field 530 may be used. For example, the most preferred access network for the application, as indicated in preferred access type field 520, to which mobile device 110 is connected and to which the minimum QoS index is satisfied, may be used.

Process 600 may further include providing a communication channel to the application using the selected access network 120 (block 650). For example, mobile device 110 may route any communication attempts by the application through the selected access network.

Figure 7:
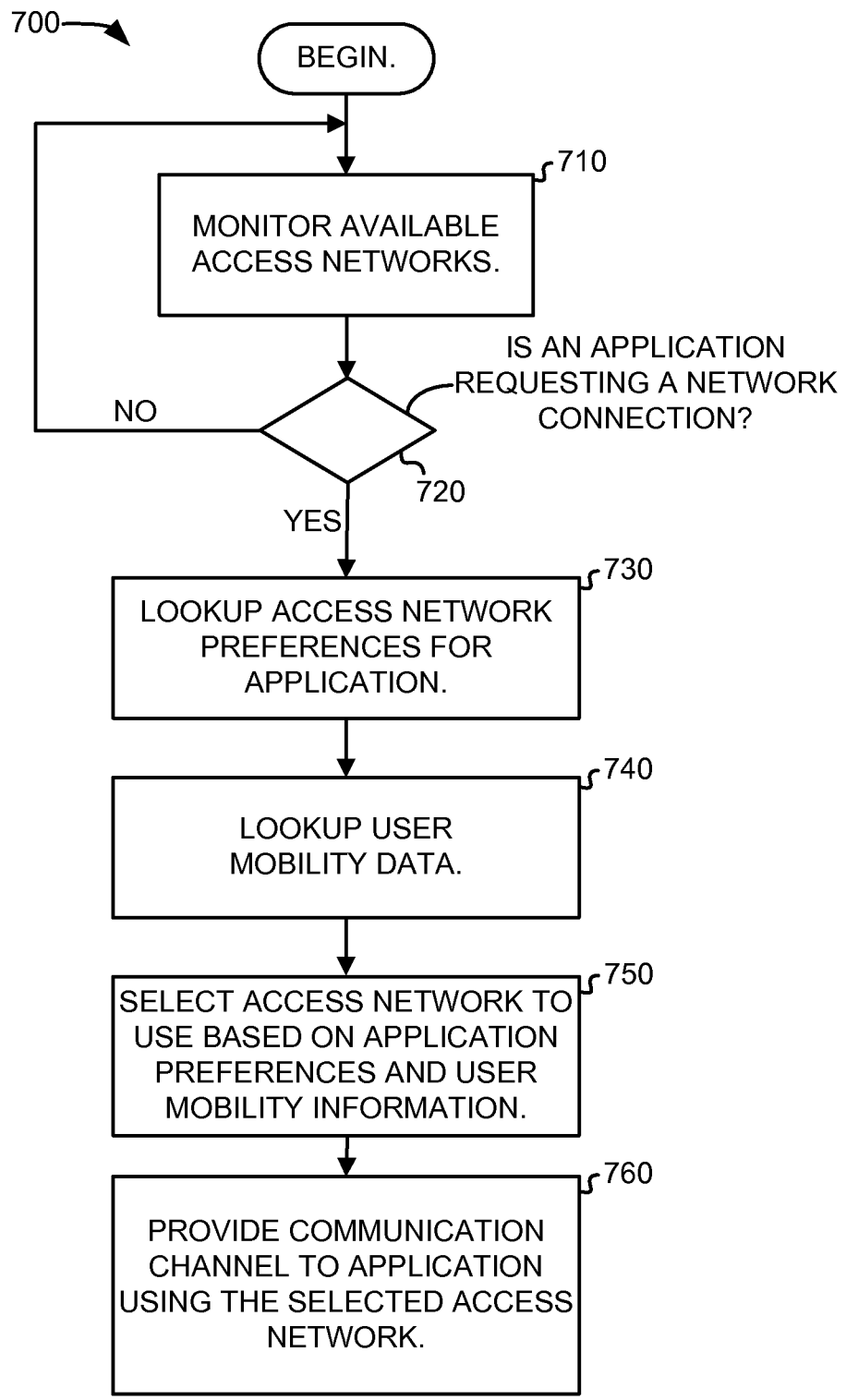
FIG. 7 is a flow chart illustrating a second example process for connecting an application through an access network.

FIG. 7 is a flow chart illustrating a second example process 700 for connecting an application through an access network. Process 700 may be performed, for example, by one of mobile devices 110. Process 700 is similar to process 600, but additionally uses user mobility information when selecting an access network.

Process 700 may include monitoring the access networks that are currently available to the mobile device (block 710). The monitored information may be maintained in a data structure, such as data structure 300 (e.g., RAT availability data 310).

Process 700 may further include determining whether an application requests a network connection (block 720). An application, such as an application executed by mobile device 110, may implement a number of services that require a network connection. Mobile device 110, such as through an operating system of mobile device 110, may assign or otherwise control the allocation of network resources to the applications.

When a network connection is requested, (block 720—YES), mobile device 110 may select an appropriate access network to use for the network connection (blocks 730, 740, and 750).

Mobile device 110 may look up the access network preferences for the application (block 730). Mobile device 110 may, for example, lookup the application in application RAT preference data 320 (e.g., data structure 300), to obtain one or more preferred access networks and/or to obtain a minimum requested QoS index for the application.

Process 700 may further include looking up user mobility information. For example, user mobility data 330 may include information relating to whether mobile device 110 is in a relatively stationary location or whether mobile device 110 is moving relative to an access network 120. As previously mentioned, the stability of a connection to certain types of access networks may change based on user mobility. For example, the range of WiFi access network 120-3 may be limited. Accordingly, a connection to WiFi access network 120-3 by a mobile user may be a less stable connection than a connection to a 3G or 4G access network. In one implementation, the looked-up mobility information may be expressed as an index quantifying a level of the user's mobility or the connection's stability.

Based on the looked-up access network preferences, for the application, and the mobility information, mobile device 110 may select an access network 120 (block 750). In one implementation, mobile device 110 may select an access network 120 to which mobile device 110 is connected and that is most preferred by the application, and for which the user mobility information is compatible, with the access network 120. For example, if mobile device 110 is determined to be moving, such as if the user is walking or riding in a vehicle, and the application's access network preference list includes WiFi as a preferred option and a cellular access network (e.g., 3G or 4G) as a second option, mobile device 110 may determine that WiFi access network 120-3, even if there is a current connection, may not be stable and may instead select the cellular access network. In an alternative possible implementation, the mobile information may be the primary factor used by mobile device 110 in selecting an access network 120, and the access network preference information may only be used if the mobility information, for two different access networks 120, is equal. In alternative implementations, other techniques, based on the access network preferences, and the mobility information, may be used to select an access network 120.

Process 700 may further include providing a communication channel to the application using the selected access network 120 (block 760). For example, mobile device 110 may route any communication attempts by the application through the selected access network.

One example of an application of the techniques discussed above will next be given with reference to FIG. 8. In FIG. 8, a sports stadium 800 is illustrated. Stadium 800 may be served by a number of wireless access networks. As shown, bases stations 810, such as base stations for 3G/4G access networks 120-1/120-2, may provide cellular network coverage to sports stadium 800. Additionally, WiFi transmitters 820 may each provide a local WiFi network. Stadium 800 may thus include a number of WiFi access networks 120-3.

Assume that a spectator in stadium 800 is carrying a mobile device 110 that is connected to one of WiFi transmitters 820 and to a base station 810. The mobile device 110 may be executing an email application that is configured to prefer WiFi network access over cellular network access. Thus, when the user is connected to both a WiFi transmitter 820 and a base station 810, the email application may communicate through WiFi transmitter 820. If the user, however, moves to a location in stadium 800, in which a WiFi connection is not available, the email application may communicate over a cellular network (i.e., through a base station 810). Other applications, however, such as a VoIP, may be configured to always prefer network communications through a base station 810.

As another example, assume that the user begins to walk around stadium 800 to the point at which the user's mobility makes any particular WiFi connection unstable. In this case, despite the fact that a WiFi connection may be available when the email application initiates a network connection, mobile device 110 may nevertheless assign the email application a network connection through a base station 810.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a mobile device, the method comprising:

monitoring, by the mobile device, availability of a plurality of access networks that provide connectivity for the mobile device to a network,
the plurality of access networks including a WiFi network and a Long Term Evolution (LTE) network;
storing, by the mobile device, preference information, on a per-application basis,
the preference information defining, for each of a plurality of applications executed by the mobile device, at least one preferred access network of the plurality of access networks,
where the preference information includes quality of service (QoS) information for the plurality of applications, and
where the QoS information includes a QoS index that specifies, as a single value, a QoS level required by at least some of the plurality of applications;
monitoring, by the mobile device, QoS information associated with each of the plurality of access networks;
selecting, by the mobile device and in response to a request, from a particular application, of the plurality of applications, to connect to the network, one of the plurality of access networks, based on the preference information for the particular one of the plurality of applications; and
providing, by the mobile device, a communication channel for the particular one of the plurality of applications using the selected access network.

2. The method of claim 1, where the selecting additionally includes:
selecting the one of the plurality of access networks based additionally on mobility information relating to a current mobility of the mobile device.

3. The method of claim 2, where the current mobility of the mobile device is determined based on stability of a connection to the WiFi network by the mobile device.

4. The method of claim 1, where the preference information includes an ordered list of preferred access networks for the plurality of applications.

5. The method of claim 1, where the monitored QoS information includes the QoS index.

6. The method of claim 1, where monitoring the availability of the plurality of access networks includes monitoring whether the mobile device is connected to the plurality of access networks.

7. A device comprising:
a communication interface including a plurality of transceiver circuits for connecting to a plurality of radio access networks,
the plurality of transceiver circuits including at least a WiFi access circuit and a Long Term Evolution (LTE) cellular access network circuit;
a processor; and
a memory to store programming instructions that, when executed by the processor, cause the processor to:
monitor availability of the plurality of radio access networks,
store preference information, on a per-application basis,
the preference information defining, for each of a plurality of applications executed by the device, at least one preferred access network of the plurality of access networks,
where the preference information includes quality of service (QoS) information for the plurality of applications, and where the QoS information includes a QoS index that specifies, as a single value, a QoS level required by at least some of the plurality of applications;

monitor QoS information associated with each of the plurality of radio access networks;

select, for an application of the plurality of applications, one of the plurality of access networks, based on the preference information for the application; and provide, through the communication interface, a communication channel for the application using the selected access network.

8. The device of claim 7, where the memory additionally stores programming instructions to:

select the one of the plurality of access networks based additionally on mobility information relating to a current mobility of the device.

9. The device of claim 8, where the current mobility of the device is determined based on stability of a connection through the WiFi access circuit.

10. The device of claim 7, where the preference information includes an ordered list of preferred access networks for the plurality of applications.

11. The device of claim 7, where the monitored QoS information includes the QoS index.

12. A method implemented by a mobile device, the method comprising:

monitoring, by the mobile device, availability of a plurality of access networks that provide connectivity for the mobile device to a network, the plurality of access networks including a WiFi network and a Long Term Evolution (LTE) network;

storing, by the mobile device, for each of a plurality of applications of the mobile device, an ordered list of preferred access networks, where the preference information includes quality of service (QoS) information for the plurality of applications, and where the QoS information includes a QoS index that specifies, as a single value, a QoS level required by at least some of the plurality of applications;

monitoring, by the mobile device, QoS information associated with each of the plurality of access networks;

selecting, by the mobile device and for a particular one of the plurality of applications, one of the plurality of access networks, based on the ordered list corresponding to the particular one of the plurality of applications; and providing, by the mobile device, a communication channel for the particular one of the plurality of applications, using the selected access network.

13. The method of claim 12, where the selecting additionally includes:

selecting the one of the plurality of access networks based additionally on mobility information relating to a current mobility of the mobile device.

14. The method of claim 12, where the current mobility of the mobile device is determined based on stability of a connection to the WiFi network by the mobile device.

15. The method of claim 12, where the monitored QoS information includes the QoS index.

16. The method of claim 12, where monitoring the availability of the plurality of access networks includes monitoring whether the mobile device is connected to the plurality of access networks.

* * * * *